(No Model.)
I. CROSS.
SPOOL OR BOBBIN.
No. 391,456. Patented Oct. 23, 1888.
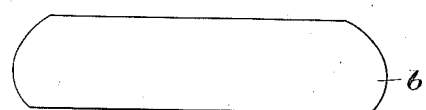
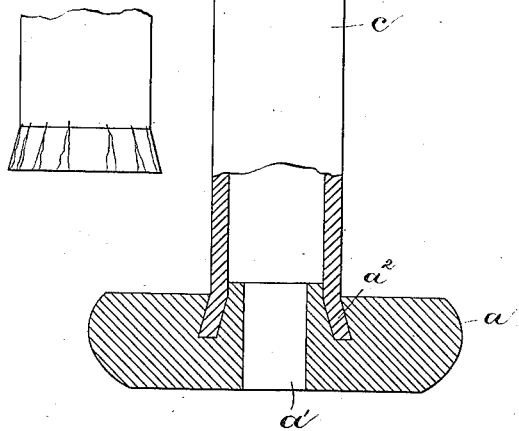
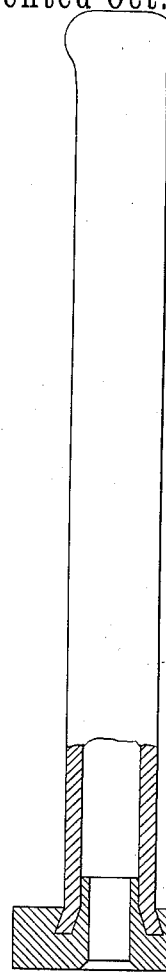
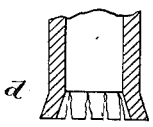
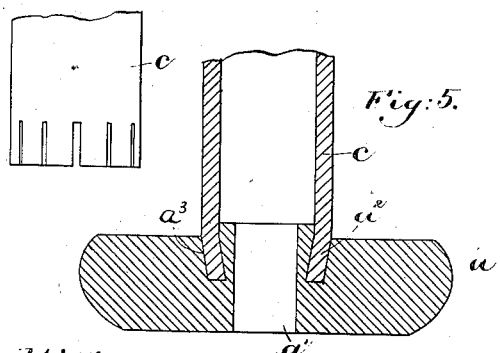
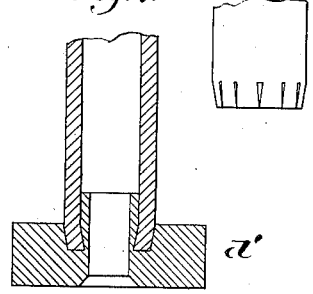
Witnesses.
Howard F. Eaton.
Frederick L. Emery.
Inventor.
Ira Cross.
by Crosby & Gregory Attys.

UNITED STATES PATENT OFFICE.

IRA CROSS, OF NASHUA, NEW HAMPSHIRE.

SPOOL OR BOBBIN.

SPECIFICATION forming part of Letters Patent No. 391,456, dated October 23, 1888.

Application filed February 3, 1888. Serial No. 262,900. (No model.)

*To all whom it may concern:*

Be it known that I, IRA CROSS, of Nashua, in the county of Hillsborough and State of New Hampshire, have invented an Improvement in Spools or Bobbins, of which the following description, in connection with the accompanying drawings, is a specification, like letters on the drawings representing like parts.

This invention has for its object to improve the construction of spools and bobbins, whereby the shanks are more rigidly held in place in the head or heads than those heretofore known to me.

In accordance with this invention the head is provided with an undercut annular groove which receives the end of the tubular shank, so that the material of the shank is turned at an angle or deflected to serve as a dovetail fastening in connection with the overhanging wall of the groove.

Figure 1 shows in elevation and partial section a spool embodying this invention, the annular groove in the head being such as to deflect the end of the shank outward. Fig. 2 shows a portion of the tubular shank of the spool removed from the head. Fig. 3 shows in elevation and partial section a bobbin, the head being grooved like unto Fig. 1. Fig. 4 shows the lower end of the tubular shank removed; Fig. 5, a section of a portion of a spool, the groove being such as to turn or deflect the end of the tubular shank inward; Fig. 6, a view of the lower end of the shank previous to its being inserted in the groove of the head; Fig. 7, a section of the lower end of a bobbin, the groove being substantially like that shown in Fig. 5; and Fig. 8, a view of the lower end of the tubular shank removed.

Referring to Figs. 1 and 2, the spool is composed of the heads $a$ $b$ and tubular shank $c$. The heads $a$ and $b$ are each provided with the usual hole or central opening, as $a'$. The heads are also each provided with an annular groove, $a^3$, around the hole $a'$, which, as shown in section, Fig. 1, is undercut, or extends from the inner face of the head $a$ into said head at a gradual outward inclination to receive the end $a^2$ of the tubular shank $c$, said end as it is pressed or forced into the groove deflecting, expanding, or spreading, as shown in Fig. 2.

The shank will also, preferably, be glued or cemented to the head $a$ in usual manner. By inclining the groove outwardly or cutting it so as to gradually increase in diameter to spread the end of the shank, as shown, the end thus spread forms a dovetail and prevents the head being removed.

In Figs. 3 and 4 a bobbin is shown composed of the tubular shank $d$ and head $d'$, said head having an annular groove, such as shown in Figs. 1 and 2, and for the same purpose. I have found in practice substantially the same results may be obtained by changing the direction of cut of the annular groove, gradually decreasing it in diameter or inclining it inward toward the center of the head, as shown in Figs. 5 and 6, showing portions of a spool. In this instance the end of the tubular shank is slitted, as by a series of saw-cuts, to thereby remove some of the material, so that the said end when forced into the groove may turn or bend inward.

In Figs. 7 and 8 a bobbin the head $d'$ of which has an annular groove such as shown in Fig. 5 is shown, whereby the end of the bobbin is turned or bent inward.

In either of the instances above described the groove has one inclined or overhanging side wall, which presents a space at one or the other side of the general line of the shank to receive the material of the shank.

I am aware that spools have been made in which the opening of a metallic head is provided with projections to fit into recesses in the end of the body, and a tapering plug is thereafter inserted to hold the head and body together. I am also aware that a spool-head has been provided with a flaring opening on its outer face, a conical bushing being inserted in the end of the body after the latter has been inserted in the head; but I do not claim either of these constructions.

I claim—

1. In a spool or bobbin, the tubular body or shank combined with the head having an annular groove in its inner face to receive the end of the shank, said groove having an inclined or overhanging side wall, substantially as and for the purpose specified.

2. The herein-described spool or bobbin, it being composed of a tubular body and a head or heads provided with an undercut annular groove, into which the end of the body is forced and deflected thereby to firmly hold against
5 the overhanging wall of the undercut groove to prevent the removal of the head from the body, substantially as described.

In testimony whereof I have signed my name to this specification in the presence of two subscribing witnesses.

IRA CROSS.

Witnesses:
BERNICE J. NOYES,
T. L. EMERY.